United States Patent
Cole

(10) Patent No.: US 6,172,608 B1
(45) Date of Patent: Jan. 9, 2001

(54) ENHANCED RANGE TRANSPONDER SYSTEM

(75) Inventor: Peter Harold Cole, West Lakes Shore (AU)

(73) Assignee: Integrated Silicon Design Pty. Ltd., Adelaide (AU)

(*) Notice: Under 35 U.S.C. 154(b), the term of this patent shall be extended for 0 days.

(21) Appl. No.: 09/202,667

(22) PCT Filed: Jun. 18, 1997

(86) PCT No.: PCT/AU97/00385

§ 371 Date: Dec. 18, 1998

§ 102(e) Date: Dec. 18, 1998

(87) PCT Pub. No.: WO97/49076

PCT Pub. Date: Dec. 24, 1997

(30) Foreign Application Priority Data

Jun. 19, 1996 (AU) .................................................. PO 0552

(51) Int. Cl.[7] .................................................. G08B 13/14
(52) U.S. Cl. .................................. 340/572.1; 340/572.7; 340/10.4; 343/719
(58) Field of Search .......................... 340/572.1, 572.7, 340/445, 447, 448, 10.4, 10.41, 10.42; 343/719, 872; 342/42

(56) References Cited

U.S. PATENT DOCUMENTS

| | | | |
|---|---|---|---|
| 4,118,693 | * 10/1978 | Novikoff | 340/572.7 |
| 4,467,641 | * 8/1984 | Abraham | 73/146.5 |
| 4,679,035 | * 7/1987 | Pfaff et al. | 340/572.1 |
| 4,751,516 | 6/1988 | Lichtblau | 343/742 |
| 5,072,222 | 12/1991 | Fockens | 342/44 |
| 5,105,190 | 4/1992 | Kip et al. | 340/825.54 |
| 5,298,894 | * 3/1994 | Cerny et al. | 343/719 |
| 5,305,008 | 4/1994 | Turner et al. | 342/44 |
| 5,455,466 | * 10/1995 | Parks et al. | 340/825.31 |
| 5,523,749 | 6/1996 | Cole et al. | 340/825.54 |
| 5,617,084 | * 4/1997 | Sears | 340/10.4 |

FOREIGN PATENT DOCUMENTS

| | | |
|---|---|---|
| WO 90/09707 | 8/1990 | (WO) . |
| WO 93/05489 | 8/1993 | (WO) . |

* cited by examiner

Primary Examiner—Jeffery A. Hofsass
Assistant Examiner—John Tweel, Jr.
(74) Attorney, Agent, or Firm—Larson & Taylor, PLC

(57) ABSTRACT

An identification and telemetry system including an interrogator (1) containing an interrogator antenna (2) for generating at an interrogation frequency, an interrogtion signal. The interrogation signal is adapted to excite over an electromagnetic coupling path (M1) at least one coded label (3) containing a label antenna (4) and a label microcircuit (5). The coded label is adapted to extract energy from the label antenna and to generate a label reply signal. The label reply signal is adapted to be conveyed to a label reply antenna and, via an electromagnetic coupling path, to a receiver in the interrogator. The label antenna is placed in proximity to a further antenna (6) being a parasitic antenna coupled electromagnetically (M2, M3) with the interrogator antenna and with the label antenna so as to enhance transfer of power between the interrogator and the coded label.

28 Claims, 7 Drawing Sheets

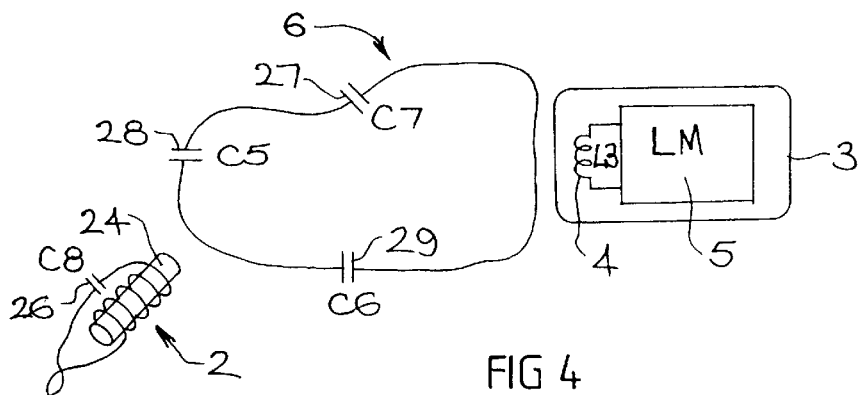
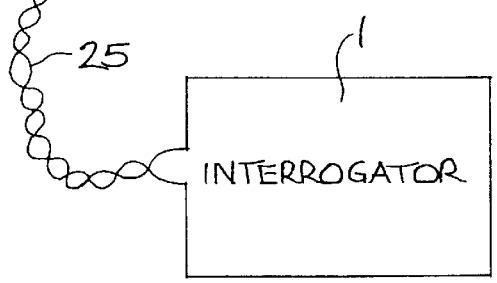
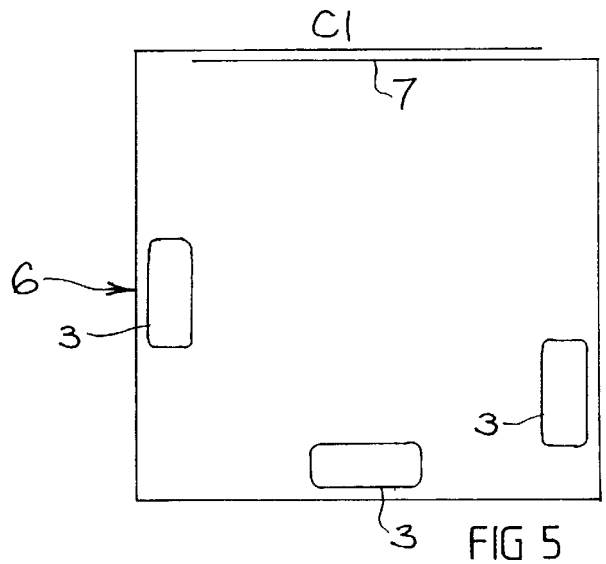
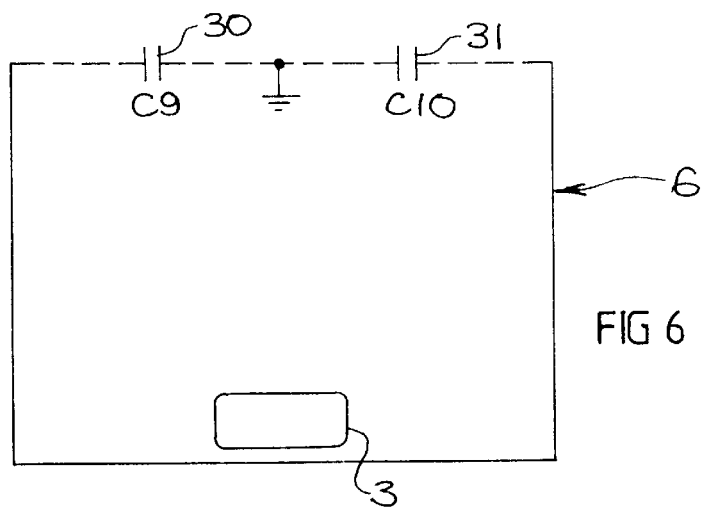
FIG 4
FIG 5
FIG 6

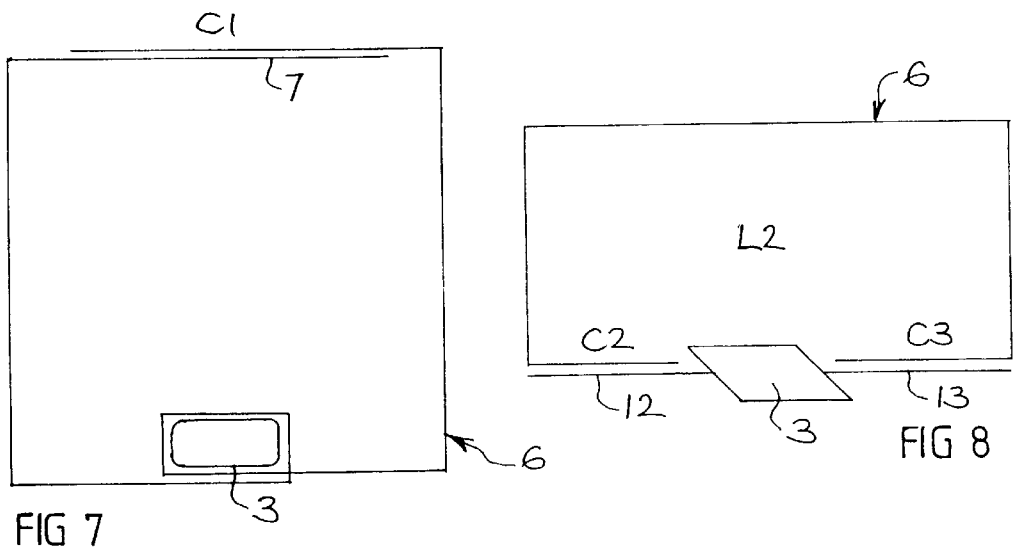
FIG 7
FIG 8
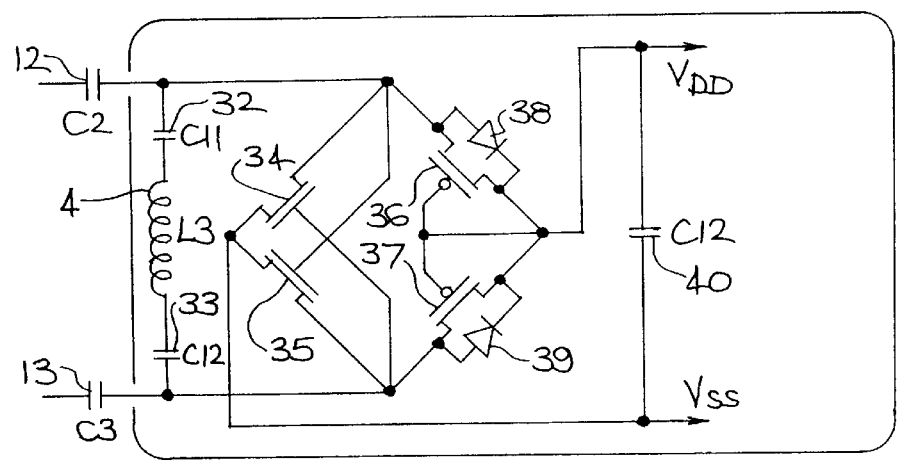
FIG 9
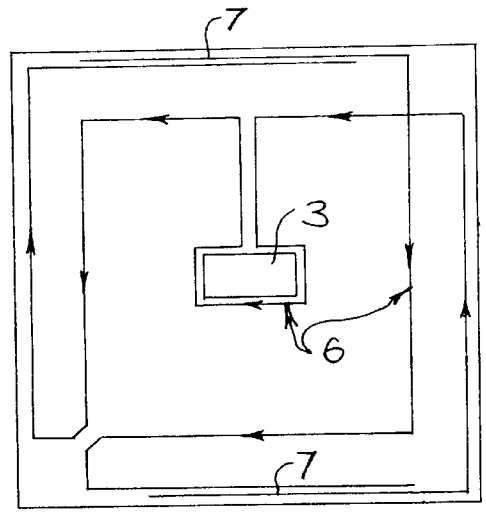
FIG 10

ENHANCED RANGE TRANSPONDER SYSTEM

FIELD OF THE INVENTION

The present invention relates to a system for remote identification of or telemetry from objects using electronically interrogatable coded labels. In particular the invention relates to a system for automated identification of articles in a warehouse or in a cargo shipping system wherein an electronic sub-system called an interrogator including a transmitter and receiver extracts by electromagnetic means useful information from an electronically coded label attached to such articles as they are processed through sorting operations or are stacked, inventoried or collected within a warehouse. Although the present invention is herein described with reference to warehouse operations, it is to be appreciated that it is not thereby limited to such applications. Thus the identification or telemetry system of the present invention may be applied to object identification operations generally.

BACKGROUND OF THE INVENTION

A simplified diagram of the type of system to which the invention relates is shown in FIG. 1. The system uses the principle of electromagnetic communication in which an interrogator containing a transmitter generates an electromagnetic signal which is transmitted via an interrogator antenna to an electronic label containing a label receiving antenna. The label antenna may receive a proportion of the transmitted energy, and through a rectifier may generate a DC power supply which may be used for operation of a reply generation circuit, connected either to the label receiving antenna or to a separate label reply antenna, with the result that an information bearing electromagnetic reply signal is transmitted from the label back to the receiver of the interrogator.

In the diagram of FIG. 1 the antennae within the interrogator and the label take the form of inductive loops. When separation between the interrogator and the label is much less than a wavelength at the operating frequency, the principal form of direct coupling between such inductive loops is provided by reactive energy storage fields surrounding those antennae and is expressed in terms of mutual inductance depicted as M1 in FIG. 1, between those loops.

In practical installations of electronic labelling systems it is desirable that labels be robust, easy to install and of low cost, All of these considerations suggest that the labels, and hence the coupling loop within the labels, be made physically small. Because some components within the label may also be fragile, it is sometimes desirable that the label be embedded well within rather than attached to the object being identified.

All these considerations combine to make the interrogation range which may be achieved with such labels and within practical restraints smaller than is desirable. This limitation is particularly relevant where the object to be identified is large, and its placement in relation to the interrogator is uncertain. Although the problem of limited interrogation range of the label can be alleviated somewhat by insuring that it is placed close to the edge of the object to be identified, there frequently occur situations in which objects to be identified are stacked, so that other objects prevent ready access of an interrogator antenna to an edge of the object closest to the label position.

One solution to this problem could be the use of a large antenna placed externally to the label, and directly connected thereto. However, such a solution generally leads to labels becoming of an unacceptable cost and fragility, and being of unsuitable dimensions for attachment to a variety of objects.

SUMMARY OF THE INVENTION

In one aspect of the present invention the problems discussed in the preceding paragraphs may be alleviated by the addition of a parasitic antenna, sometimes known as an auxiliary antenna, which while not being directly connected to the label, does have some coupling thereto, and has coupling also to the interrogator antenna. Such coupling between the interrogator antenna and the parasitic antenna can, either as a result of the parasitic antenna being physically large or through a portion of it lying close to the interrogator antenna, easily exceed direct coupling between the interrogator and the label. Thus the parasitic antenna may through being of a larger size collect more energy from the interrogation field, which may by virtue of electromagnetic compatibility regulations, be constrained to have a low value.

The parasitic antenna may in addition visit more of the external regions of a large item to be identified, so that however that item is stacked, there is the possibility of bringing the antenna of an interrogator system into reasonable proximity to the parasitic antenna. In addition, the parasitic antenna may be shaped or oriented to be responsive to more field directions than is practicable for the label antenna itself. Moreover, the parasitic antenna may be made conformable to a range of objects of shape unpredictable at the time of manufacture of the label itself, or to objects whose shapes change over time.

The parasitic antenna may also simultaneously provide enhanced coupling between an interrogator and a plurality of electronic labels which the interrogator interrogates either simultaneously or within a short space of time.

In all of these circumstances the parasitic antenna preferably should have appropriate coupling to the label antenna or the label circuits, so that a significant portion of the energy received by the parasitic antenna may be transferred to the label, and a significant portion of the reply generated by the label may in turn be transmitted via the parasitic antenna back to the interrogator.

According to the present invention there is provided an identification and telemetry system including an interrogator containing an interrogator antenna for generating at an interrogation frequency an interrogation signal adapted to excite over an electromagnetic coupling path at least one coded label containing a label antenna and a label microcircuit, said coded label being adapted to extract energy from said label antenna and to generate a label reply signal, said label reply signal being adapted to be conveyed to a label reply antenna and via an electromagnetic coupling path to a receiver in said interrogator, wherein said label antenna is placed in proximity to a further antenna being a parasitic antenna coupled electromagnetically with said interrogator antenna and with said label antenna so as to enhance transfer of power between said interrogator and said coded label.

According to one aspect of the present invention the coupling between the further or parasitic antenna and both interrogator and label may be provided by mutual inductance. This is a non-contact form of coupling which may provide significant advantages in installation, in that there is no necessity for electrical contacts to be made or exposed, and thus the disadvantages of such contacts which include corrosion or accidental damage to the label through direct electric contact to damaging potentials may be avoided. In addition installation is simplified as the time to make contacts may be eliminated from the installation procedure.

According to another aspect of the present invention, such coupling either between the label and the parasitic antenna or between the parasitic antenna and the interrogator can be provided by mutual capacitance. The latter may be created by placing elements in proximity.

Coupling between the label antenna and the parasitic antenna may be further enhanced by shaping the parasitic antenna so that currents therein produce enhanced electromagnetic fields in the small region occupied by the label antenna.

According to another aspect of the invention, the parasitic antenna can be made resonant at the operating frequency of the interrogation system. It is particularly advantageous if this resonance could be created by appropriate shaping of the parasitic antenna to create an appropriate combination of inductance, capacitance and flux collecting area, without there being any contacts made within the parasitic antenna, and without any additional components, such as lumped capacitors, being added thereto.

According to another aspect of the invention the parasitic antenna may be shaped so that it is sensitive to field components which are in a different direction to those which directly excite the label antenna, and can be further configured, particularly in respect of its impedance characteristics, so that directly induced voltages within the label antenna are not in phase with voltages indirectly introduced through operation of the parasitic antenna, so that the two coupling mechanisms may not interfere destructively.

According to yet another aspect of the present invention, the rectifier circuit within the label may be configured so that it is suitable for monolithic integration and at the same time requires no dc return path to be provided either by the antenna within the label or by a parasitic antenna to which there is no direct connection.

According to a still further aspect of the present invention the parasitic antenna may be shaped to minimise its interaction with objects at a greater distance than the proposed interrogation antenna distance, while maintaining the interaction with the interrogation antenna, so that detuning of the parasitic antenna and resultant loss of sensitivity through the presence of nearby objects including ground may be minimised.

According to a still further aspect of the present invention the parasitic antenna may be constructed from conducting portions of the object itself to be identified. As current distributions in the antenna in such cases are not always satisfactory for interrogation with a particular carrier frequency of the interrogator, the interrogator in such cases may be made adaptive so that interrogations with a range of carrier frequencies may be made with a view to performing an interrogation with a current distribution on the object which produces good coupling between the label, object and interrogator. For such variable frequency interrogation the interrogation antenna itself and the signal separation systems within the interrogator may be re-configured to enhance coupling to the antenna of the object to be identified or to enhance separation between the interrogation and reply signals within the interrogator.

According to a further aspect of the invention signal separation system within the interrogator may be configured to take an optimum form in relation to phase noise characteristics of the interrogator transmitter and frequency dependent characteristics of the impedance of the interrogator antenna.

According to a still further aspect of the invention the antenna of the interrogator may be configured to minimise strength of the interrogation field at an electromagnetic compatibility enforcement position without significant effect on the field established at the position of the object to be identified.

BRIEF DESCRIPTION OF THE DRAWINGS

Preferred embodiments of the present invention will now described with reference to the accompanying drawings wherein:

FIG. 4 shows a configuration of an interrogator, a movable hand-held interrogator antenna, a deformable parasitic antenna coupled in turn to an electronic label;

FIG. 5 shows a plurality of labels and a resonant parasitic antenna with no internal connections and no direct contact with the labels;

FIG. 6 shows a label, and another form of resonant parasitic antenna with no internal contacts and making no contact with the label;

FIG. 7 shows a parasitic antenna with a large flux collecting area and enhanced coupling to a label;

FIG. 8 shows a parasitic antenna and a label oriented to sense differently directed components of the interrogation field;

FIG. 9 shows a rectifier circuit suitable for microcircuit integration in a label and requiring no dc return either within the label antenna or an external parasitic antenna;

FIG. 10 shows a parasitic antenna configured to minimise its interaction with objects at a greater distance than the proposed interrogation antenna distance, while maintaining interaction with the interrogation antenna;

DESCRIPTION OF THE PREFERRED EMBODIMENTS

Figure 1:
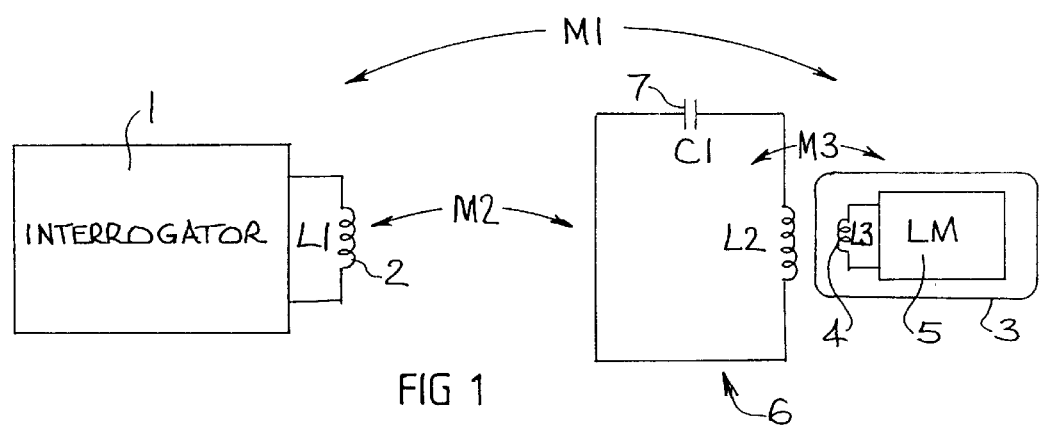
FIG. 1 shows major sub units of an electronic label identification system containing an interrogator, an electronic label, and a parasitic antenna with one form of coupling to the label.

FIG. 1 shows an arrangement of an interrogator system in which an interrogator 1 containing an interrogator antenna 2 which forms a loop with self-inductance L1 and excites a coded label 3 containing an label antenna 4 of self-inductance L3 over an electromagnetic coupling path represented by mutual inductance M1. The label 3 contains a label microcircuit (LM) which is responsible for extracting energy from label antenna 4, generating a label reply, and conveying that label reply to the label antenna 4, or perhaps to some separate label antenna not shown.

The label antenna 4 is also excited via an electromagnetic coupling path provided by the mutual inductance M2 by parasitic antenna 6 with self inductance L2 tuned by capacitor 7 of capacitance C1. The current which circulates in the parasitic antenna 6 also excites the label antenna 4 over an electromagnetic coupling path shown by mutual inductance M3.

In this embodiment the label antenna 4 is likely to be small and have small flux collecting area, but the parasitic antenna can be made physically large so as to have a large flux collecting area, exceeding one square metre, and can therefore be well-coupled to the field generated by interrogator 1. In a warehouse application the parasitic antenna can take the form of a wire loop which surrounds the base of each pallet on which goods are stacked, whereas the label antenna is likely to have an area of the order of one percent of the area of the parasitic antenna.

An advantage of this antenna configuration is that however pallets are stacked, at least a portion of the parasitic antenna will lie at an accessible edge. In this embodiment the interrogator antenna 2 is responsible for receiving the reply from the label and can do so via the relative weak coupling path provided by M1 and the much stronger coupling path provided by mutual inductance M2.

Suitable interrogators and labels for incorporation in systems of this nature have already been described, for example in PCT AU90/00043, PCT AU92/00143, and PCT AU92/00477 and are incorporated herein by cross reference.

Figure 2:
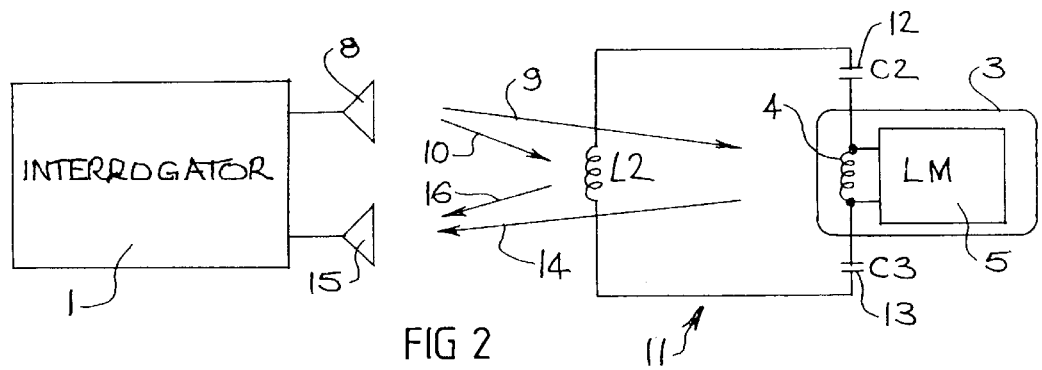
FIG. 2 shows an alternative electronic labelling system including an interrogator, a label, and a parasitic antenna with a different form of coupling to the label.

An alternative preferred embodiment of the present invention is shown in FIG. 2, in which the interrogator 1 excites the label 3 by electromagnetic fields created by transmitter antenna 8 either via direct coupling path 9 between transmitter antenna 8 and label antenna 4 or via separate electromagnetic coupling path 10 between interrogator antenna 8 and parasitic antenna 11 which may be directly connected via coupling capacitors 12 and 13 to the label antenna or by no-contact means in which equivalent capacitors are created by placement of parts of the parasitic antenna in proximity to appropriate terminals of or leads of the label 3. The parasitic antenna may be tuned in part by capacitors 12 and 13 and in part by the input capacitance of the label microcircuit 5. The reply generated by the label is conveyed either by direct electromagnetic path 14 to a interrogator receiver antenna 15, but may be alternatively conveyed first to the parasitic antenna and from there via electromagnetic coupling path 16 to the interrogator receiver antenna 15. An advantage of this particular embodiment is that strong non-contact coupling between the parasitic antenna and the label may be established if appropriate means to create the effective capacitances 12 and 13 are employed.

Figure 3:
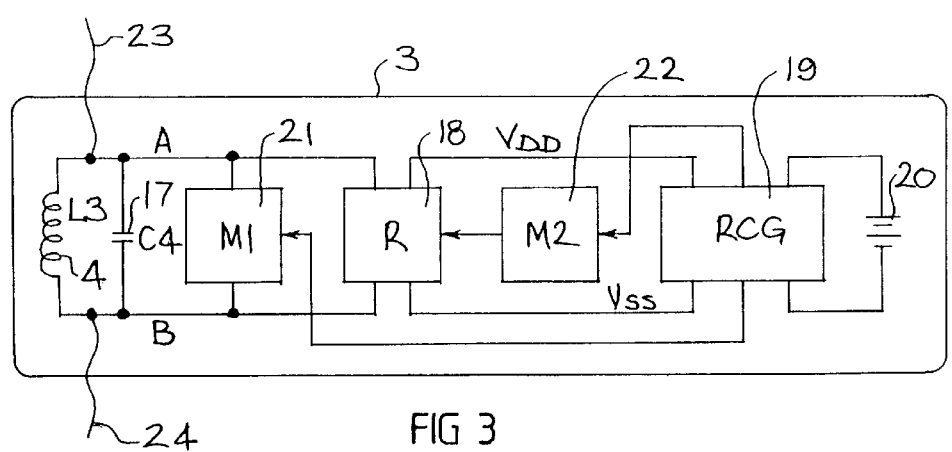
FIG. 3 shows elements which can be combined to make several forms of electronic coded label, and providing for various forms of non-contact coupling thereto.

Suitable sub-units for incorporation with the label are shown in FIG. 3. Many of the operations within the label are as disclosed in PCT AU90/00043, PCT AU92/00143, and PCT AU92/00477 but will be for convenience discussed briefly here. In this embodiment the label antenna 4 is tuned by resonating capacitor 17 to the operating frequency of the interrogator. Rectifier circuit 18 extracts energy from the interrogation signal and supplies it to reply code generator circuit 19 which may in some embodiments also receive energy from a label battery 20. The reply code generator circuit produces a reply code, generally in the form of a binary digital modulation of either frequency or phase of a sub-carrier, which is used either to directly modulate the label impedance through modulator 21 or indirectly modulate the label impedance by placing a variable load on the rectifier through modulator 22. Coupling of the label to external fields may be provided by inductive means via label coupling loop 4, or alternatively by capacitive means via fly-leads 23 and 24, which run externally to the body but are connected to circuit nodes A and B shown in the diagram or alternatively via conducting pads within the label body, those pads being connected to nodes A and B, the said pads being placed in close proximity to parts of the parasitic antenna.

In FIG. 4 some practical details of an interrogator, parasitic antenna and label are shown. Here the interrogator 1 has for its interrogated antenna 2 a coil wound on a ferrite core 24 connected via flexible cable 25 to the interrogator. The interrogator antenna coil is series tuned by resonating capacitor 26. The assembly of ferrite coil and capacitor is known as a reading wand and is brought by the operator into proximity to the parasitic antenna 6, which in this case is tuned by three separate series resonating capacitors 27, 28 and 29 which are distributed around its periphery.

As the diagram of FIG. 4 shows, the parasitic antenna may be made of irregular shape. The employment of resonating capacitors reduces electric fields associated with parasitic antennae of significant circumferential length. In addition, if the parasitic antenna is of reasonably fine wire, the self inductance of the structure is strongly dependent upon the length of the circumference, which remains constant as the parasitic antenna is deformed, and while being somewhat dependent also upon the shape of that antenna, is not strongly so, so that the parasitic antenna can remain reasonably within resonance as it is deformed. The reduction of electric field which derives from the employment of the plurality of series capacitors also assists in maintaining a substantially constant resonant frequency as deformation of the antenna takes place.

In this embodiment coupling between the parasitic antenna 6 and the label antenna 4 is established by placing the label close to one portion of the periphery of the parasitic antenna.

One preferred embodiment of parasitic antenna 6 is illustrated together with a plurality of labels 3 in FIG. 5. In this example coupling between the parasitic antenna 6 and the antennas of labels 3 is provided by placing labels 3 inside the loop of parasitic antenna 6 and preferably in proximity with a part, such a side of the parasitic antenna. The resonating capacitance C1 of the parasitic antenna is however not provided by an explicitly connected capacitance element, but is provided instead by non-contact means, by configuring the parasitic antenna so that its ends overlap, with an appropriate spacing and for an appropriate distance, so that the appropriate capacitance 7 is thereby provided. This embodiment has the benefit that neither connections to the label nor connections within the parasitic antenna are required, and the parasitic antenna can easily be made resonant, even though it is of a length which is substantially less than a wavelength, and a large and well-defined flux collecting area for the parasitic antenna is defined by the configuration.

An alternative embodiment of label and parasitic antenna is shown in FIG. 6. In this case capacitances 30 and 31 between the ends of the parasitic antenna 6, which contribute to its resonant condition, are established not by placing the ends in proximity but by exploiting the capacitances shown as C9 and C10, which each of those ends will have both to one another and to ground.

Yet another preferred embodiment for the parasitic antenna is provided in FIG. 7. In this embodiment the antenna 6 is again tuned by capacitance 7 provided by appropriate overlap of the ends. However, coupling between the parasitic antenna and the label is enhanced by shaping the parasitic antenna to have one or more turns which immediately surround the area occupied by the label. This configuration has the benefit of having a large flux collecting area for the parasitic antenna and an enhanced and adjustable (through varying the number of turns) coupling between the parasitic antenna and the label.

Yet another preferred embodiment of the parasitic antenna and the label is provided in FIG. 8. In this embodiment the parasitic antenna is coupled to the label via mutual coupling by capacitances 12 and 13 which exist between fly-leads attached to the label and sections of the parasitic antenna 6 that are placed in proximity thereto. In this embodiment the parasitic antenna is made planar and placed in a plane which is orthogonal to that of the label 3. In this way the two antennas which energise the label circuit respond to different components of the magnetic field established by the interrogator. The advantage of this system is that interrogation of the label for a wide range of interrogation field orientations becomes possible. This is particularly so when the phase relationships established by the resulting impedance of the parasitic antenna ensure that the voltage induced within the label by its coupling, either inductive or capacitive, are approximately in quadrature with signals induced directly in the label antenna from the interrogator field. There is in that situation no possibility that the two signals will cancel for a particular orientation of label.

One preferred embodiment for the rectifier system within the electronic label is shown in FIG. 9. This bridge rectifier system, which is realised from a combination of p and n channel transistors and diodes between the p regions and n-type substrate, has the property that the rectification process is performed in a way which minimises flow of minority carriers to either substrate or well of the cmos fabrication process. In this embodiment ac excitation signals either from a parasitic antenna are conveyed by capacitors 12 and 13 or from the internal antenna 4 are conveyed by capacitors 32 and 33 to the bridge rectifier containing n-channel transistors 34 and 35, p-channel transistors 36 and 37 and pn diodes 38 and 39. The dc output of this rectifier is collected in reservoir capacitor 40. It may be noted that in this bridge rectifier a return current path between the positive and negative supply rails labelled as VSS and VDD is provided internally to the rectifier circuit, so that no dc contact between that circuit and the parasitic antenna is required. The use of either inductive or capacitive coupling to that parasitic antenna is therefore feasible and remains so whether the internal antenna 4 is directly connected to the rectifier circuit or is coupled thereto via the capacitors 32 and 33 as shown.

A still further preferred embodiment for the parasitic antenna 6 is shown in FIG. 10. By tracing the current paths shown in FIG. 10, and recognising that the current traverses the capacitor 7 provided by overlap of conductors, it can be seen that in this embodiment the antenna can be regarded as two dipolar antennas, of which the enclosed area is confined substantially to the periphery of the object to be identified and to a region at the centre providing coupling with the label.

It can be further recognised that these dipoles are of opposite polarity, so that the field external to the object to be identified and at a significant distance therefrom is that of a magnetic quadrupole, in which the field amplitude diminishes as the fourth power of distance from the object.

An advantage of this antenna configuration is that it is, relative to a simple dipole, subject to lesser detuning caused by large objects, including ground, which may be near to the object being identified, and in a warehousing application the resonant frequency of the antenna is therefore not much affected by whether the pallet being identified is stacked on the ground or some height above ground.

In this design, despite the reduction in included area of each of the dipoles, the conductors carrying oppositely directed currents are sufficiently separated for the area between those conductors to capture the majority of the flux which emerges from the usual design of hand-held interrogation antenna, the field pattern of which approximates that of a magnetic dipole or quadrupole.

In another aspect of the invention it is recognised that the object to be labelled is frequently much larger than the label itself, and metallic parts of the object will have currents induced thereon by the interrogation field. It is advantageous to make use of these current-carrying portions of the object as a parasitic antenna which does not form a part of the electronic label as manufactured, but operates in conjunction therewith to have a strong coupling to the interrogator electromagnetic field.

This effect can be particularly advantageous if impedance associated with the current-carrying portion of the object and the input impedance of the microcircuit within the label can be made resonant, so that reactances which can impede good transfer of power from the object to the label are tuned out or are substantially reduced, and if the interrogation frequency is varied so that this condition is reached or more nearly approached.

Figure 11A:
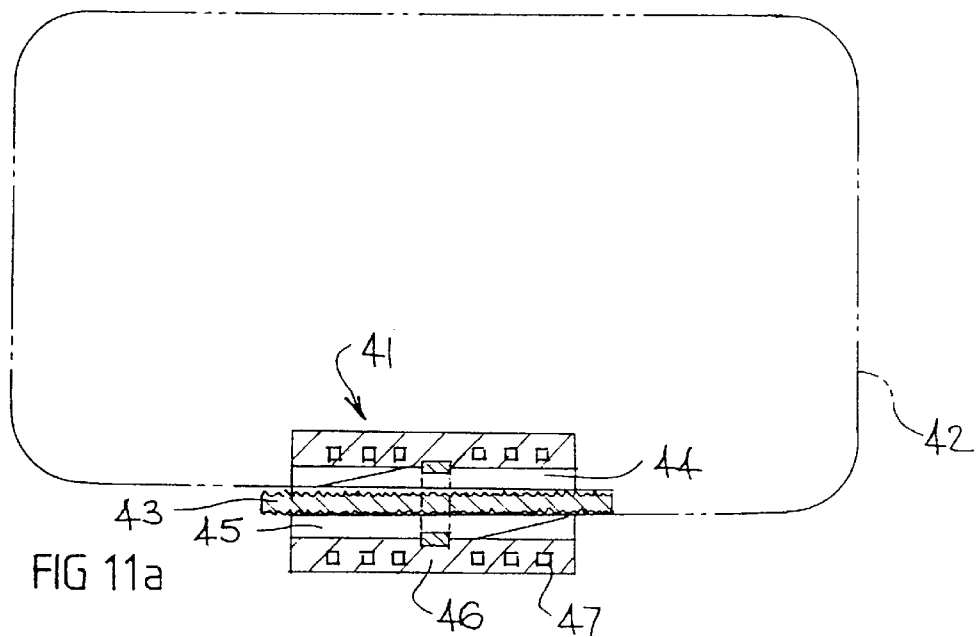
FIGS. 11($a$), ($b$) and ($c$) show a combination of a code responding label integrated into the joining clamp of an object baling strap with the strap itself serving as a parasitic antenna.

A realisation of this condition is depicted in FIGS. 11(a), (b) and (c). In this realisation, the object to be identified is for example, a wool bale or a large cardboard container which is given strength by one or more large metal straps, one of which is shown as 42 in the figures, fastened in tension around the periphery of the object.

The two ends of the strap are clamped together by code responding clamp 41 containing insulating pad 43 with surfaces roughened to provide resistance to movement when the clamp is assembled. Opposite ends of the baling strap are held in place by conducting wedges 44 and 45, inserted into insulated moulded body 46, but are separated electrically through operation of the insulating pad 43.

Insulated moulded body 46 of the clamp provides electrical insulation but is given circumferential strength through inclusion of rectangular metal stampings 47. Within the clamp is a code responding microcircuit 48 which has a two-terminal electrical interface to which conducting leads 49 and 50 are connected and which protrude from the inner surfaces of the moulded body of the clamp.

In view of principles already outlined in this disclosure, it may be seen that is not necessary that there be within the label any dc connection between these terminals. Excitation of the code-responding microcircuit can be performed by immersing those terminals in the strong electric field, or through the action of the parasitic antenna, formed by the conducting parts of the object being identified and to which the microcircuit becomes connected after the clamp is assembled.

Figure 11B:
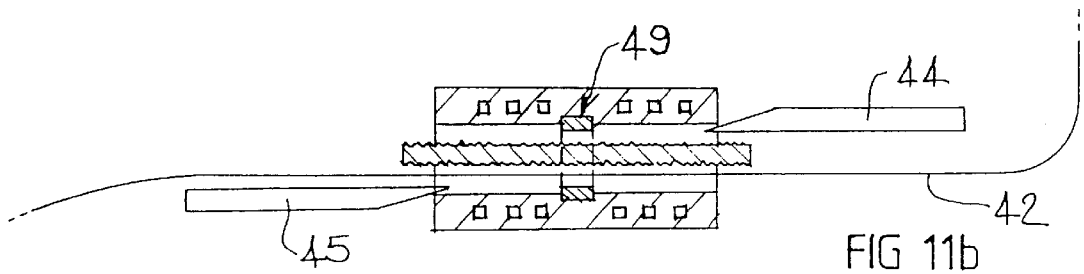

FIG. 11(b) shows steps involved in the process of assembling the clamp to the object. In this process the clamp body without the conducting wedges in place may be held in an assembly tool through which one end of the baling strap is first passed below the insulating pad and then bent around the object. After traversing the circumference of the object, the baling strap is again passed through the clamp, this time above the insulating strap. When it reaches the end of the clamp its further passage will be impeded by the clamping tool which is used to drive into place the upper wedge 44. The strap is then tightened on the object by pulling the free end of the strap in one direction while the clamping tool and clamped end of the strap are pulled in the other. When sufficient tension in the strap has been established, the clamping tool is operated to drive home the second wedge 45, and to cut off the free end of the baling strap.

Figure 12A:
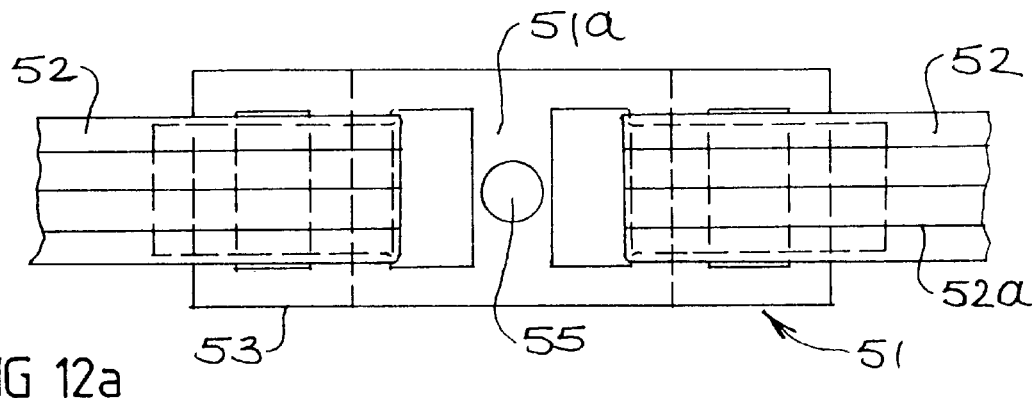
FIGS. 12($a$), ($b$) and ($c$) show an alternative arrangement of a code responding label integrated into the joining buckle of a baling strap.

An alternative embodiment of these concepts is provided in FIGS. 12(a), (b) and (c). This embodiment is suited to the use of more flexible nylon straps 52 commonly used in industry to give strength to cardboard cartons. In this embodiment the normally woven nylon straps are made conductive through inclusion within the weave of the straps of a number of metal threads 52a made from a material sufficiently ductile for the straps to remain unbroken when tension is applied to them.

The strap is joined by a buckle 51 as shown in FIGS. 12(a) and (b) which may be made from a metal stamping 53 and then coated with an insulating material 51a. To the buckle is attached a circuit board containing a label microcircuit 55 attached to circuit board 54 containing conductive paths 56 and 57 which lie exposed on one side of the buckle. The buckle, circuit board and code responding label form an integral component. The assembly of buckle and code responding microcircuit may be tested for correct function by applying electric fields to exposed conductors 56 and 57. When the nylon strap forming part of the object is threaded through the buckle, currents induced by the interrogation field on those straps provide coupling between the interrogator and the microcircuit.

Figure 13:
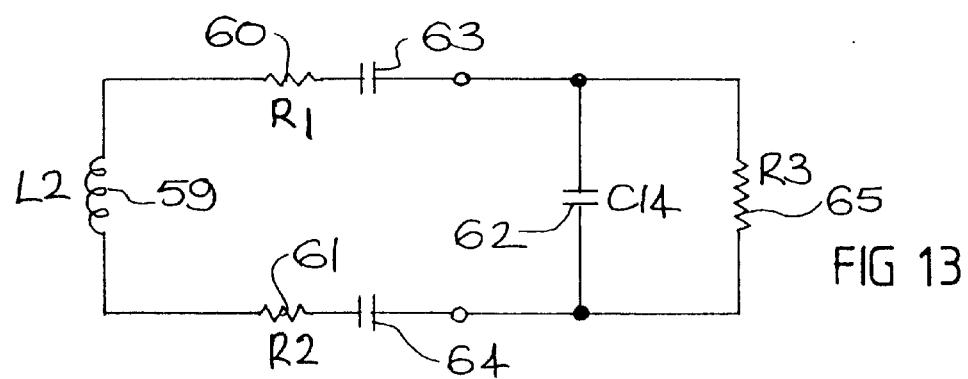
FIG. 13 illustrates the impedance elements of a code responding label and a parasitic antenna formed from conducting parts of an object to be identified.

Aspects of the coupling provided between the label and the peripheral straps are illustrated in FIG. 13. Depending upon the ratio of the free space wave length at the interrogation frequency to the strap length, current distribution on the strap may be either substantially uniform or substantially non-uniform. The strap will, acting as a parasitic antenna, have a radiation resistance 60, an internal loss resistance 61, and when the strap is not excessively long a reactance represented by inductor 59. When the strap length exceeds a half a wavelength at the operating frequency, the reactance can become capacitive.

In FIG. 13 the elements 63 and 64 represent capacitors associated with an electric field antenna through which the label may be interrogated in the absence of the parasitic antenna. The input impedance of the non-antenna portion of the label is represented by effective capacitance 62 and parallel resistance 65, both of which have some variation with frequency but not a variation as extreme as that represented by the circuit elements representing the impedance of the strap, and of its coupling to the label antenna.

The condition for optimum power transfer between the parasitic antenna formed by the strap and the microcircuit placed within the clamp or buckle is one of conjugate match, that is where the label and strap impedances are complex conjugates. As it is desirable to manufacture a single type of label, and the strap length is dependent on the object size, this condition of conjugate match is difficult to maintain over a wide range of objects and installations, and the structure is not always sensitive to externally applied fields.

This difficulty may be alleviated by configuring the interrogator of the system to search for replies over a range of interrogation frequencies. It is generally true that straps forming a part of a large object will have at some interrogation frequency a large radiation resistance and possibly a large magnitude positive or negative reactance. In this situation coupling can be improved by lowering the interrogation frequency to a value where the strap impedance becomes inductive, so that it may resonate the label input capacitance, and the radiation resistance becomes lower so that the quality factor of the resonant circuit becomes higher. In such a system the diminishing tendency of magnetic field producing antennas to radiate may allow larger interrogation fields to be produced, thus further improving label excitation. On the other hand, smaller objects may already have low strap reactances and resonance is likely to occur at higher frequencies.

Although interrogation at a significant number of frequencies can be contemplated, electromagnetic compatibility regulations in some jurisdictions give the frequencies 27.12 MHz, 13.56 MHz and 6.78 MHz, which are the centres of industrial scientific and medical bands, a preferred position in that interrogation fields allowable at these frequencies are significantly greater, in fact by 20 dB, than at neighbouring frequencies.

Figure 14:
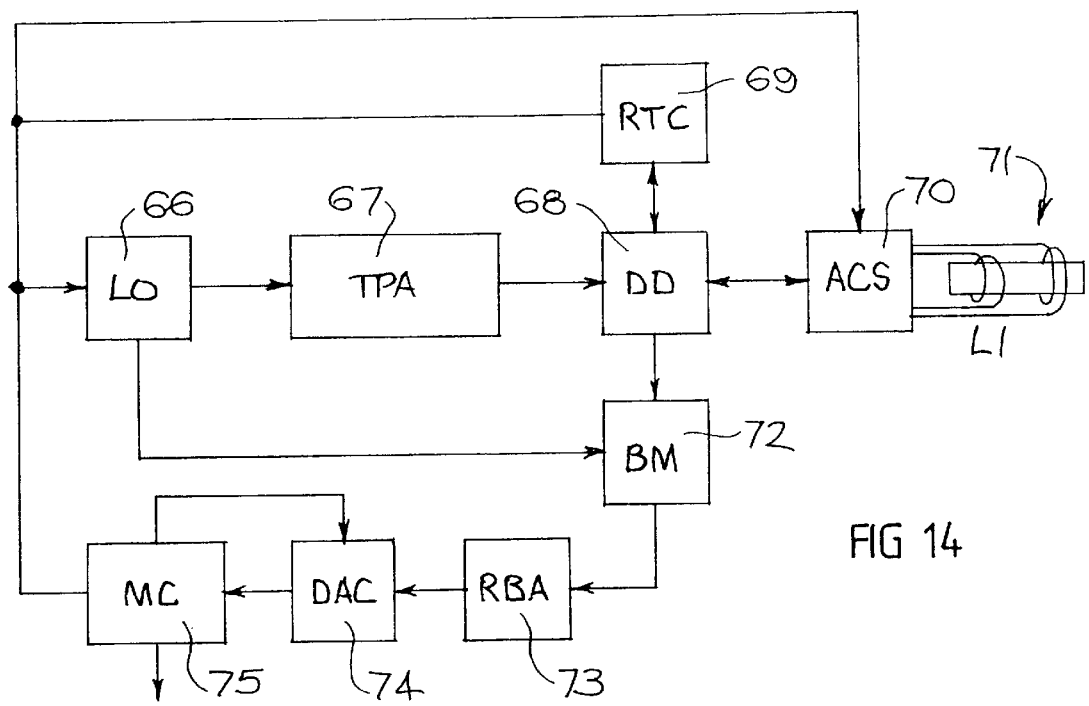
FIG. 14 is an outline diagram of an interrogator configurable for operation at various frequencies.

A block diagram of an interrogator which permits switching between a pair of interrogation frequencies is shown in FIG. 14. This interrogator can use many of the principles outlined in PCT AU90/00043, PCT AU92/00143, and PCT AU92/00477, but is varied from them in the way to be described. In this interrogator, the signal for exciting the label originates in local oscillator (LO) 66, which is switchable between the two frequencies 6.78 MHz and 13.56 MHz. The energising signal is amplified in transmitter power amplifier (TPA) 67 and passes through directional coupler or directional detector (DD) 68 with reference arm terminated in reference termination circuit (RTC) 69 and then through antenna configuration switch (ACS) 70 to the interrogation antenna 71 which may take the form of a plurality of windings on a ferrite core.

Reply signals received in the form of modulated sidebands of the interrogation signal are passed through the antenna configuration switch 70 to the directional coupler or directional detector 68 to balanced mixer (BM) 72 which is fed at its local oscillator port with a portion of the original transmitter oscillation signal. In this mixer the reply signal is down-converted to a baseband signal which is amplified in receiver baseband amplifier (RBA) 73 and sampled by digital to analogue converter (DAC) 74 so that a sampled version of the reply signal is available to micro controller (MC) 75. The micro controller conducts digital filtering and signal analysis on the sampled reply and extracts the reply code.

As has been described in the disclosures referenced, the interrogator operates in a pulse mode in that the interrogator energy is supplied for a period, commonly the order of 1 ms, sufficient to extract one coherent reply from the electronic label, this excitation period being followed by a period of no transmission during which the label reply, already captured in the analog to digital conversion process, is analysed.

In the interrogator outlined in FIG. 14, the interrogation transmissions can alternate in the carrier frequency between two values, for example 13.56 and 6.78 MHz. In the period between these alternate transmissions, the antenna configuration system 70 and reply termination circuit 69 can be re-configured so that their characteristics are appropriate for the next interrogation transmission.

Figure 15:
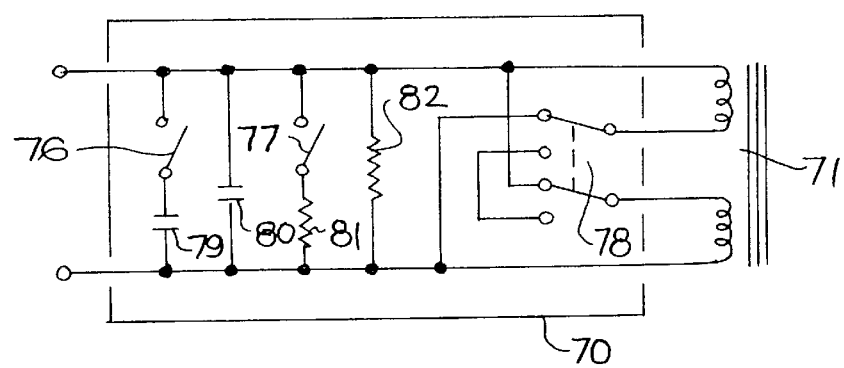
FIG. 15 is a circuit diagram showing details of a form of antenna re-configuration.

A preferred embodiment of an antenna configuration system or switch is shown in FIG. 15. In this circuit switches 76, 77 and 78 operating under control of the micro controller 75, allow the self inductance of interrogator antenna 71 the effective values of resonating capacitor 79 and 80 and damping resistors 81 and 82 to be changed so that for each interrogation transmission the antenna is tuned, with an appropriate quality factor, to the carrier frequency of the interrogation frequency then in use. In this tuning the antenna configuration not only requires the correct resonant frequency and quality factor but also the appropriate dynamic impedance to match characteristic impedance of the directional coupler or directional detector 66 and any transmission line placed between that element.

Figure 16:
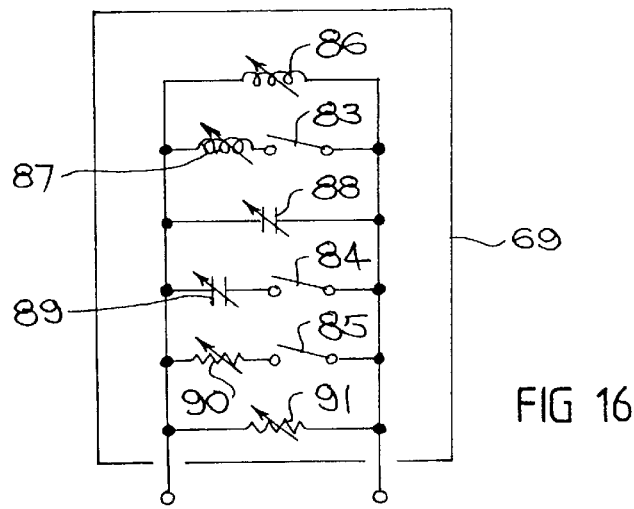
FIG. 16 is a circuit diagram showing a frequency dependent and re-configurable reference termination for use in signal separation systems within an interrogator.

A preferred embodiment of the receiver termination circuit is shown in FIG. 16. The important aspects of FIG. 16 are firstly that in whatever condition the switches are found, the termination presented to directional coupler or directional detector 68 generally employed in homodyne interrogators using a single interrogation antenna is not a fixed broad-band impedance, but that of a resonant circuit, of which the characteristics can be matched to that of the interrogation antenna. As the principal source of noise in such homodyne interrogators is phase noise in the transmitter signal, the use of this form of termination allows the minimisation of coupling, over the band occupied by the reply signal, of this phase noise into the receiver.

In FIG. 16 all elements of the tuned circuits are shown as adjustable, and can usefully be fine tuned during manufacture so that minimisation of transmitter signals and noise entering the receiver can be enhanced by such adjustment. In an interrogator designed to operate at two interrogation frequencies, switches 83, 84 and 85 operating under control of the microcontroller 75 allow switching of the effective values of inductance provided by inductors 86 and 87, capacitance provided by capacitors 88 and 89 and resistance provided by resistors 90 and 91 of the reference termination provided to the directional coupler or directional detector 68. Thus the condition of minimisation of transmitter signals and noise reaching the receiver can be maintained for each of the two interrogation frequencies. When more interrogation frequencies are used, more complex switching arrangements can be employed to configure the interrogation signal generation and separation systems appropriately.

As an alternative to operation of the interrogator at an alternating pair of frequencies, a considerable number of distinct interrogation frequencies can be used. In such a case, the antenna and signal separation re-configuration can be effected through use of voltage controlled resistors, inductors and capacitors, with control voltages derived from look-up tables within the interrogator. In this way a dense exploration of antenna sensitivity with frequency can be made. The practicability of the concept is supported by the fact that size range of commonly occurring warehouse items is such that the inductance of parasitic antennas of the type described in FIGS. 11 and 12 is not likely to vary over a range of more than four to one, and hence resonant frequencies formed between such antennas and labels of fixed input capacitance will not vary over a ratio of more than two.

Figure 11C:
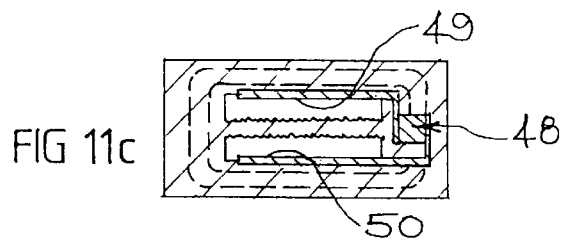
Figure 12B:
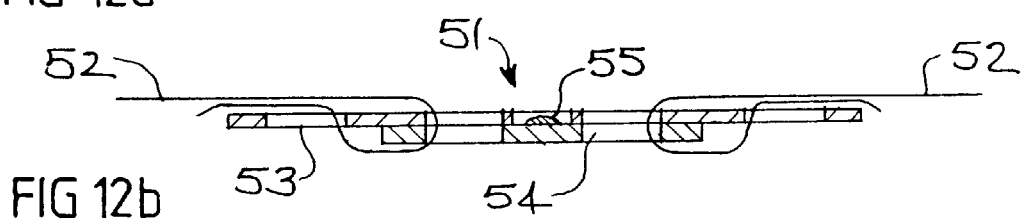
Figure 12C:
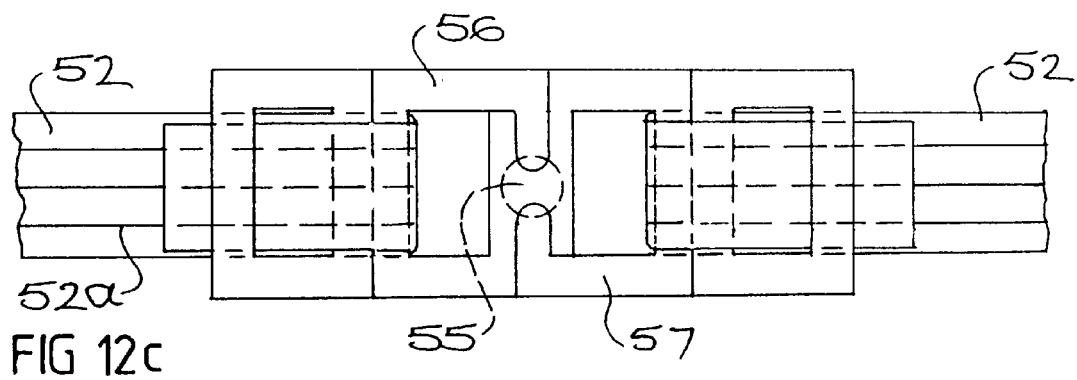

One of the hazards of establishing a direct connection between a parasitic antenna and a label microcircuit as has been suggested in relation to FIGS. 11 and 12 is presented by the discharge of static electricity originating in other elements into the microcircuit with consequential damage thereto. One measure to minimise this effect has already been incorporated into the system described in FIG. 11. Here the microcircuit is fully embedded within the joining clamp, and the only elements that can in practice make contact to the terminals of the microcircuit are the ends of the baling strap, between which ends no electrostatic potential can exist.

Figure 17:
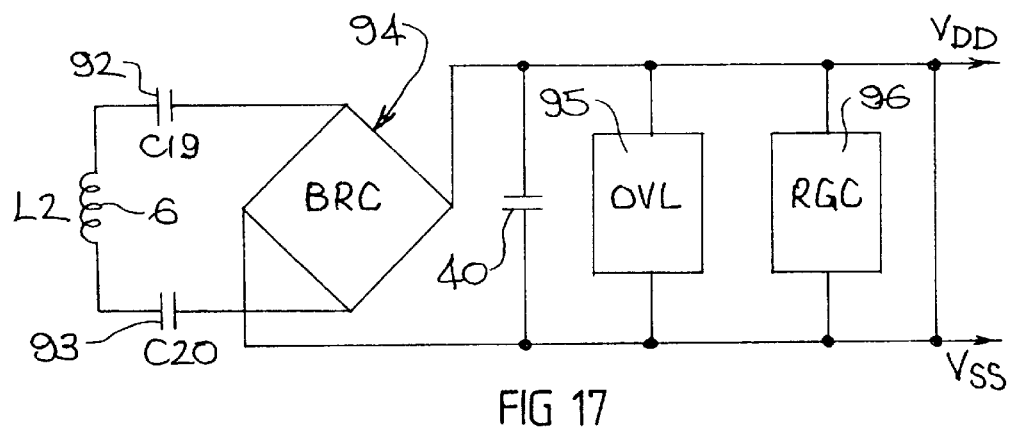
FIG. 17 is a circuit diagram showing a discharge protection system useful when external antennas are to be connected to electronic labels.

Further measures to protect against such damage are outlined in FIG. 17. Here the parasitic antenna 6 does not make direct connection to portions of the microcircuit which can sustain dc current, but is instead connected by current limiting capacitors 92 and 93 to a bridge rectifier circuit (BRC) 94 the output of which is connected to reservoir capacitor 40 and over-voltage limiter (OVL) 95 and reply generation circuit 96. The reservoir capacitor 40 can be sized to have a magnitude significantly greater than current limiting capacitors 92 and 93, with the effect of limiting the transient discharge voltage which can appear across critical paths of the microcircuit. Those voltages are further limited by over-voltage limiter circuit 95 which has the property of providing a low-impedance path between supply nodes VSS and VDD while the voltage between those nodes exceeds a desired value.

The robustness of the circuit can be further enhanced through the use of large area diodes and transistors within bridge rectifier circuit 94 which can for example take the form already shown in FIG. 9. Although the use of large area components within this rectifier tends to increase its input capacitance and the losses in the rectification process, such loss to performance in the electronically coded label is more than compensated for by the increased sensitivity of the large 20 area parasitic antenna formed by exploiting as shown in FIGS. 11 and 12 the currents which flow on the object to be identified.

Figure 18:
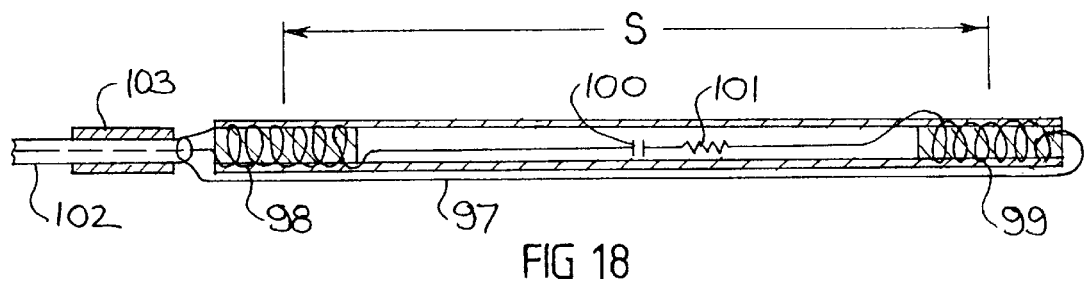
FIG. 18 shows a variety of interrogator antenna suitable for hand held operation.

A preferred form of antenna for an interrogator is shown in FIG. 18. This antenna, known as a reading wand, is suitable for hand-held operation in which the antenna is brought by hand near to one portion of the parasitic antenna which excites the label.

In FIG. 18, an insulating rod 97 carries at the ends a pair of ferrite cores, over which coil windings 98 and 99 are placed. The windings 98 and 99 are connected in series so that the common value of current which flows in them produces magnetic fields which are in opposition, making oppositely directed but same magnitude magnetic dipoles, and forming a field creation structure known as a magnetic quadrupole.

The cores are separated by a distance s which is large compared with the distance expected between the rod end and the parasitic antenna which excites the label, but small in relation to both the electromagnetic wavelength at the interrogation frequency and the distance at which electromagnetic compatibility regulations are enforced, the latter being commonly a distance of ten metres.

To achieve a convenient driving impedance the coil is tuned by capacitor 100 and loaded by resistor 101. It may be shown that the resonant circuit so formed should have a high quality factor to enable the creation of a large interrogation field with small power consumption.

The windings and tuning elements are driven over a flexible transmission line shown as the co-axial line 102 around which ferrite sleeves 103 are placed to avoid the presence of currents on the outside of the cable connecting the interrogation antenna to the interrogator. Such currents make the impedance seen at the end of the cable sensitive to wand position, and inhibit both the achievement and preservation of a high order of interrogation and reply signal separation within the interrogator.

A significant advantage of the interrogation antenna shown if FIG. 18 is that when coil 99 is placed close enough to a parasitic antenna to interrogate a label, the field distribution near to coil 99 is substantially that of the magnetic dipole created by coil 99 alone, and diminishes only as the inverse third power of distance. At significant distance however, and particularly at distances large compared with the coil separation s, the fields of the two dipoles substantially cancel, and the resulting field diminishes as the inverse fourth power of distance, so that only a small field at the electromagnetic compatibility enforcement distance remains. The result is that higher values of interrogation exciting field may be legally created close to the end of reading wand.

According to still further aspect of the invention the label may be manufactured without a magnetic field responding antenna and coupling to the interrogation field may be achieved through the operation of a conducting metal strap or wire of one or more turns placed around the object to be identified and coupled to the label either by direct or capacitive connection.

The strap may with the input impedance of the label form a resonant circuit which may be of high quality factor and be at one of the operating frequencies of the interrogator. Labels may be manufactured with a range of capacitances of which the appropriate one is selected at time of installation to facilitate this condition.

A capacitance external to the label and dependent on the strap length may be introduced to bring the strap to resonance at such a frequency. Connection between the added capacitor or label may be established by direct or capacitive connection.

In establishing a direct connection, either between the label or added capacitor and the strap, conductive adhesive may be used. In establishing a capacitive connection between these elements a capacitance may be formed between a flat strap and flat leads connected either to the label or added capacitor, a thin layer of insulation adhesive may be used. The added capacitance itself may be formed by the overlap of the magnetic field antenna strap and further strap separated therefrom by a thin layer of insulation which may be adhesive, and the overlap length may be adjusted to produce the desired value of capacitance.

Measurements of strap inductance may be performed before addition of a label or added capacitor, so that the component values which produce resonance at the interrogation frequency may be selected. An application tool may perform the strap inductance measurement and dispense the appropriate label, added capacitor, or appropriate length of overlay strap, with the appropriate capacitance.

It will be appreciated that various alterations, modifications and/or additions may be introduced into the constructions and arrangements of parts previously described without departing from the spirit or ambit of the present invention.

What is claimed is:

1. An identification and telemetry system including an interrogator containing an interrogator antenna for generating at an interrogation frequency an interrogation signal adapted to excite over an electromagnetic coupling path at least one coded label containing a label antenna and a label microcircuit, said coded label being adapted to extract energy from said label antenna and to generate a label reply signal, said label reply signal being adapted to be conveyed to a label reply antenna and via an electromagnetic coupling path to a receiver in said interrogator, wherein said label antenna is placed in proximity to a further antenna being a parasitic antenna coupled electromagnetically with said interrogator antenna and with said label antenna so as to enhance transfer of power between said interrogator and said coded label.

2. An identification and telemetry system as claimed in claim 1 including a plurality of coded labels which said interrogator is adapted to interrogate substantially simultaneously.

3. An identification and telemetry system as claimed in claim 1 wherein said electromagnetic coupling is provided by mutual inductance.

4. An identification and telemetry system as claimed in claim 3 wherein said parasitic antenna is shaped so as to enhance in the region of the or each coded label an electromagnetic field produced by said parasitic antenna.

5. An identification and telemetry system as claimed in claim 4 wherein said shaping includes one or more turns which surround a space occupied by the or each coded label.

6. An identification and telemetry system as claimed in claim 1 wherein said electromagnetic coupling is provided by mutual capacitance.

7. An identification and telemetry system as claimed in claim 1 wherein said parasitic antenna is resonant at said interrogation frequency.

8. An identification and telemetry system as claimed in claim 7 wherein said resonance is produced by appropriately shaping said parasitic antenna to create a combination of inductance, capacitance and flux collecting area without any contacts being made within said parasitic antenna and without additional components being added thereto.

9. An identification and telemetry system as claimed in claim 7 wherein a portion of capacitance required to produce resonance of said parasitic antenna is provided by non-contacting overlap of its conductors.

10. An identification and telemetry system as claimed in claim 7 wherein a portion of capacitance required to produce resonance of said parasitic antenna is provided by capacitance to ground of its conductors.

11. An identification and telemetry system as claimed in claim 1 wherein excitation of the or each label antenna provided by said parasitic antenna is adjusted to avoid destructive interference with excitation of the or each label antenna provided by direct coupling between said interrogation antenna and said label antenna.

12. An identification and telemetry system as claimed in claim 11 wherein said excitation is adjusted by adjusting impedance characteristics of said parasitic antenna so that directly induced voltages within the or each label antenna are not in phase with voltages indirectly introduced through operation of said parasitic antenna.

13. An identification and telemetry system as claimed in claim 1 wherein there exists no dc return path in the parasitic antenna.

14. An identification and telemetry system as claimed in claim 1 wherein there exists no dc return path in the or each label antenna.

15. An identification and telemetry system as claimed in claim 1 wherein said parasitic antenna is shaped to reduce the ratio of the electromagnetic field which it produces in a far field region to the electromagnetic field which it produces in a near field region.

16. An identification and telemetry system as claimed in claim 1 wherein portions of an object to be labelled or its packaging form part of the parasitic antenna.

17. An identification and telemetry system as claimed in claim 7 wherein the interrogator is adapted to adjust the interrogation frequency to allow for changes in the resonant frequency of said parasitic antenna.

18. An identification and telemetry system as claimed in claim 17 wherein said interrogation frequency is adjusted so that it alternates between two values.

19. An identification and telemetry system as claimed in claim 17 wherein said interrogation frequency is adjusted so that it exhibits a sequence of distinct frequencies.

20. An identification and telemetry system as claimed in claim 1 wherein said interrogator is configure to reduce noise signal reaching said receiver of said interrogator as a result of noise present in said interrogation signal of said interrogator.

21. An identification and telemetry system as claimed in claim 20 wherein a reduction in said noise reaching said receiver is provided by a termination circuit having impedance characteristics of a resonant circuit matched to said interrogation antenna.

22. An identification and telemetry system as claimed in claim 1 wherein said interrogator antenna is configured to maximise the ratio of the electromagnetic field produced at a label position to the electromagnetic field produced at an electromagnetic compatibility regulations enforcement position.

23. An identification and telemetry system as claimed in claim 22 wherein the interrogation antenna includes a magnetic Quadrupole antenna.

24. An identification and telemetry system as claimed in claim 23 wherein ferrite sleeves are placed on a cable connecting said interrogator antenna to said interrogator.

25. An identification and telemetry system as claimed in claim 16 wherein said parasitic antenna includes a baling strap surrounding said object and said coded label is incorporated into a joining buckle of said strap.

26. An identification and telemetry system as claimed in claim 25 including means for measuring inductance of said strap and for dispensing an appropriate label, capacitor or length of overlay strap so that values which produce resonance at the interrogation frequency are selected.

27. An identification and telemetry system as claimed in claim 6 wherein the coupling between said parasitic antenna and the or each coded label is provided in a form which places a limit on accidental discharge of current through the or each coded label at the time the parasitic antenna is coupled to the or each coded label.

28. An identification and telemetry system as claimed in claim 1 wherein impedance characteristics of said parasitic antenna and the or each label antenna are complex conjugates.

* * * * *